Feb. 16, 1971 L. K. HAHN 3,564,598
RANDOM PULSE POSITION DETERMINING SYSTEM AND METHOD
Filed Dec. 20, 1966 5 Sheets-Sheet 1

INVENTOR
Linus K. Hahn
BY
ATTORNEY

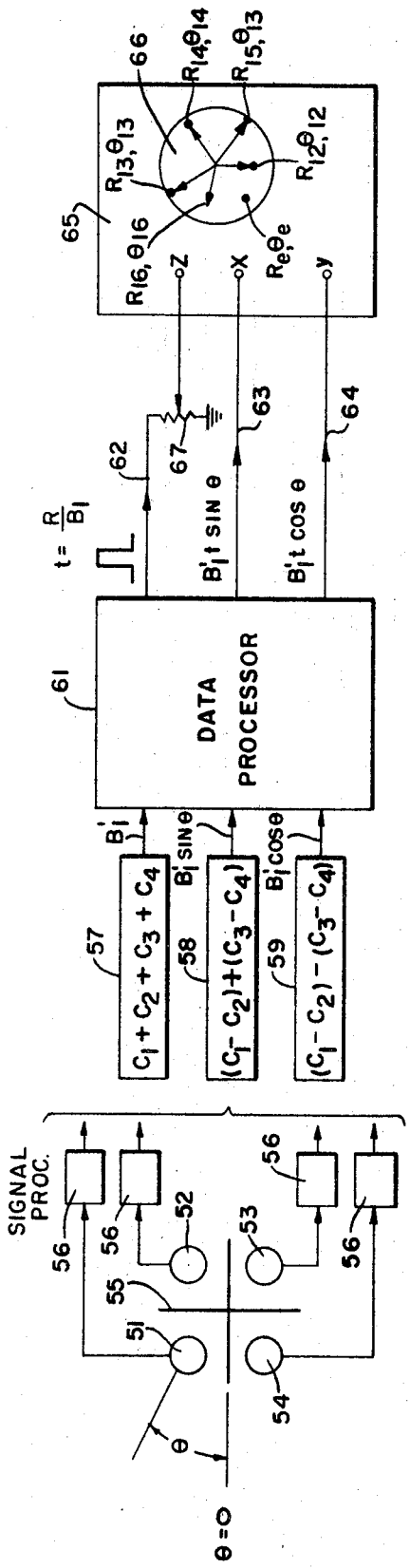
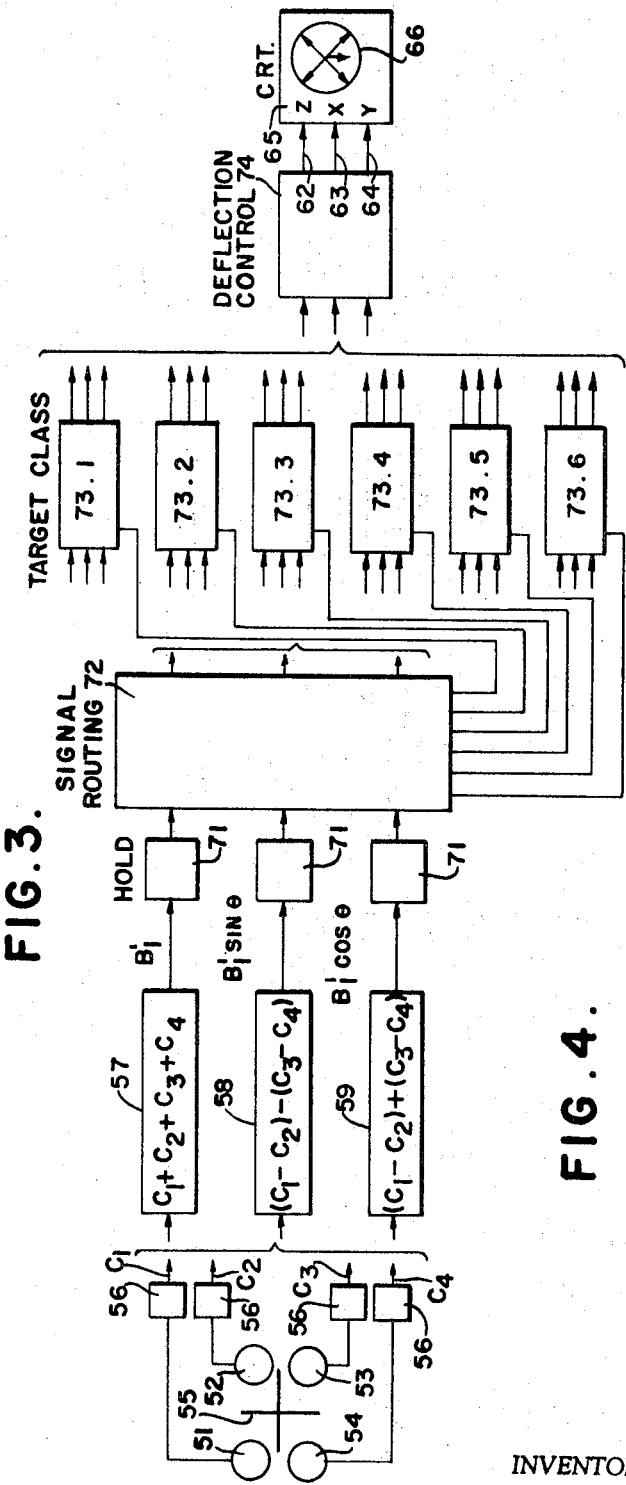
FIG. 3.
FIG. 4.
INVENTOR
Linus K. Hahn
BY
ATTORNEY

INVENTOR
Linus K. Hahn
BY
ATTORNEY

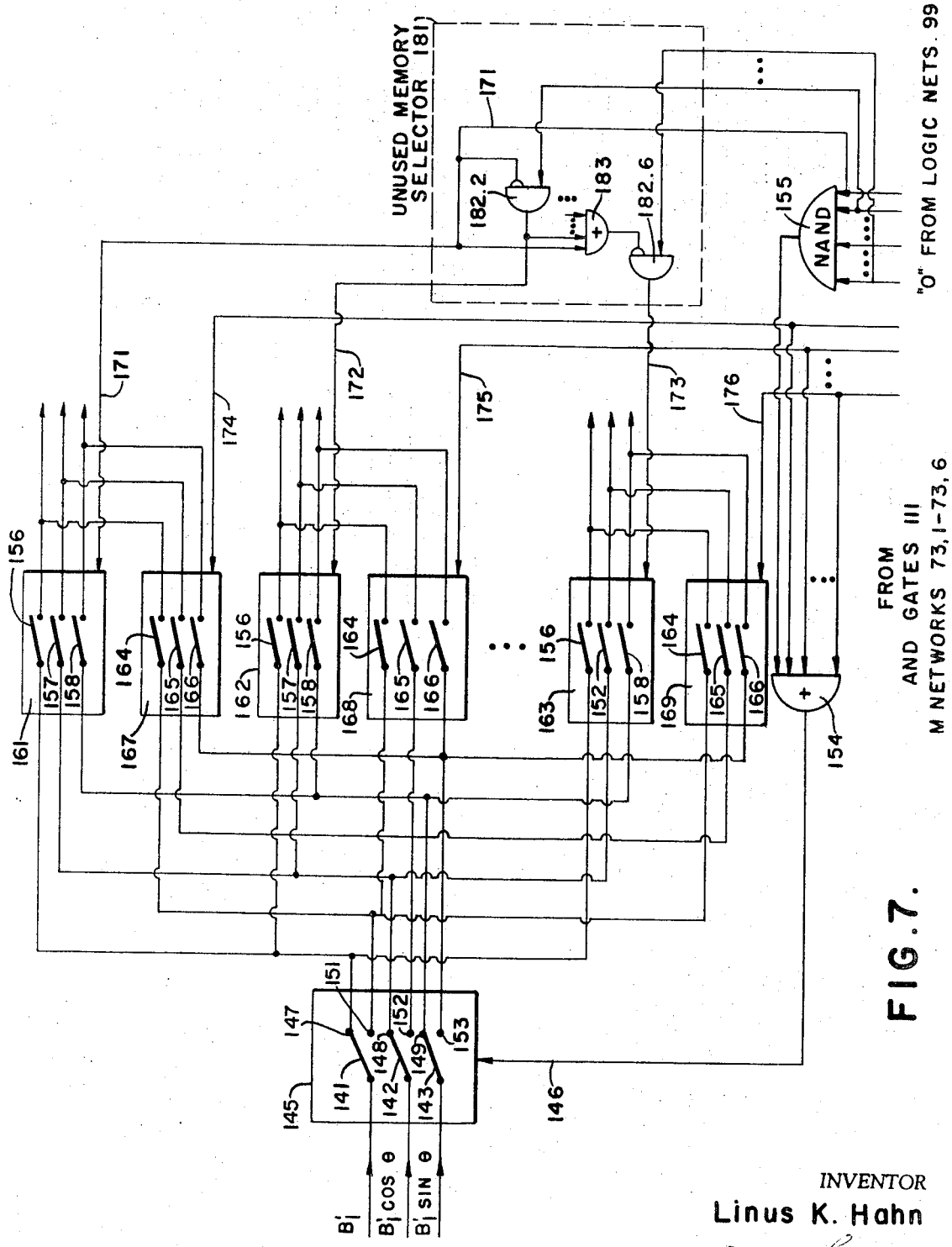

United States Patent Office 3,564,598
Patented Feb. 16, 1971

3,564,598
RANDOM PULSE POSITION DETERMINING
SYSTEM AND METHOD
Linus K. Hahn, Columbus, Ohio, assignor, by mesne assignments, to the United States of America as represented by the United States Atomic Energy Commission
Filed Dec. 20, 1966, Ser. No. 603,221
Int. Cl. G01t 1/16
U.S. Cl. 250—83.3
22 Claims

ABSTRACT OF THE DISCLOSURE

A system for determining the relative positions of a plurality of nucleonic sources relative to a nucleonic detector includes a single processing channel for deriving signals indicative of the range and azimuth of the sources relative to the detector. The signals are applied to a plane position indicator having memory features such that an indication of a nucleonic source position is derived only in response to the repeated derivation of similar range and azimuth indicating signals. The memory may comprise a cathode ray tube phosphorous face or electronic computing type network.

The present invention relates generally to systems and methods for determining the relative position of more than two objects and more particularly to such a system and method wherein each of the objects includes a radiation source for deriving, within a predetermined time interval, approximately an equal number of pulses having random occurrence times.

In the copending patent applications of Leonard C. Brown, entitled "Range and Angular Position Detector," Ser. No. 588,199 and Charles E. Krause, entitled "Position Detecting System and Method Utilizing Pulsed Penetrating Radiation," Ser. No. 588,205, both filed Oct. 20, 1966, there are disclosed systems and methods for determining the relative position of more than two objects in a group of objects utilizing penetrating radiation. As defined in the Brown and Krause applications and utilized herein, penetrating radiation is electromagnetic energy that: has a wavelength less than visible light; is penetrative of clouds and fog; and is not substantially refracted or reflected from clouds or fog. Typical examples of penetrating radiation are X-ray tubes and radioactive sources.

In the Brown application, the relative range and angular direction between a pair of objects are determined by employing a calibrated penetrative radiation source on the first object and a stationary or fixedly mounted array of penetrating radiation receivers on the second object. The array comprises at least three, and preferably four, identical and symmetrically arranged receivers that are shadowed from each other by shields interposed between them, as well as by the receivers themselves. By providing an array as specified, the outputs of the several receivers can be considered as periodic with respect to the angular position of the source, but phase displayed with respect to each other. By summing the responses from the several receivers and selectively subtracting the responses from them, information indicative of the relative range and angular position is derived with a data processor on board the second object.

In addition to disclosing a system for measuring the relative position between a pair of objects, the Brown application discloses a system wherein the relative range and angular position between more than two objects in a group can be determined. To determine the relative position between more than two objects, the source on each object emits penetrating radiation continuously at a predetermined, fixed modulation frequency which is different for each source in the group. The radiation level derived from each source is continuously modulated at a fixed frequency by mechanically rotating an apertured shield, or the like, about a nucleonic source.

To determine the relative position of one object with respect to the others, a transmitting radiation source and a detector array responsive to radiation transmitted are mounted on the objects to provide signals to on-board data processing equipment. The data processor separates the different frequencies and feeds them into separate data processing channels to derive range and angle information for each object in the group. In the case of helicopter formation keeping, one of the disclosed uses for the Brown system, establishment of a priori knowledge regarding all source modulation frequencies in the group and separation thereof is frequently difficult, if not impossible. Because of the limited frequency spectrum available to modulate the radiation level sinusoidal, the number of objects having sources in the Brown system is limited.

The apparatus of the Krause application overcomes many of the disadvantages associated with the system disclosed in the Brown application by utilizing penetrating radiation sources that are pulsed, i.e., switched between ON and OFF states. The radiation pulses are derived at a fixed, predetermined frequency, whereby the several transmitting objects are considered as being in a time-sharing relationship with each other. Hence, the requirement for multiple data processing channels for each received modulation frequency is obviated since a single data processing channel is time-shared between the several transmitting radiation sources.

While the system and method disclosed in the Krause application eliminates many of the disadvantages attendant with the apparatus disclosed by Brown, it does have problems of pulse time coincidence, particularly when there is a relatively large number of objects in the group being considered. If a sufficiently large number of pulse time coincidences occur in the Krause system, there is a great possibility of erroneous results being displayed and likelihood that one of the objects will not be indicated as being in the group. If a large number of objects are in the group, a priori knowledge is frequently required regarding the rates at which pulses are derived from the several sources.

According to the present invention, the problems associated with the systems and methods disclosed by Krause and Brown are obviated by employing on board a plurality of objects in the group a source which derives, within a predetermined time interval, approximately an equal number of penetrating radiation pulses having random occurrence times. Each receiver in the group is provided with a memory that allows only those signals that are of approximately the same magnitude as a previous signal that was derived during a predetermined time interval to be displayed visually. Because pulses are derived from the plural sources on a random time basis, there is a small but finite probability that two sources on board objects in the group will be pulsed ON simultaneously. Hence, there is a low probability that detected signals within the predetermined time interval will have approximately the same magnitude, whereby erroneous results are not displayed.

According to one embodiment of the invention, the randomly detected signals in each receiver are fed to a memory that comprises a cathode ray tube phosphorescent face. Phosphor responding to an electron beam impinging thereon has an inherent integrating qualtity, whereby a spot is displayed only in response to repeated activation of a particular location on the CRT face within a predetermined time. Hence, if a particular location on the cathode ray tube face is activated only once in response to a pair of sources in the group emitting radiation pulses simultaneously, no visual indication is provided at that spot and erroneous results are not derived. The use of a cathode ray tube for memory purposes, however, is not, in all instances, completely satisfactory because the tube face attains a relatively light background in response to the randomly occurring coincidence pulses.

To obviate the difficulties associated with the cathode ray tube memory and display, a second embodiment of the invention was developed wherein signal magnitude storage means is provided. A plurality of separate storage channels is provided, one for each of the transmitting objects in the group. The received signals that are of approximately the same magnitude as the average value of the stored signals for one radiation source are fed to the memory and those that do not fall within the boundaries are discarded. The memory is continuously updated so that signals that occurred more than a predetermined interval prior to the instant being considered are erased from the memory. Because the objects do not move materially during the interval during which the memory retains information, the average values of the stored signals can be utilized for recognition of input signals and translation thereof into signals indicative of a true object location or of pulse coincidence. In addition, the average values are preferably employed for display purposes to provide a display having a dark background that can be used in normal optical environments.

According to another aspect of the present invention, the number of pulses emitted from each radiation source over the predetermined time interval is changed as the number of objects in the group varies. The change in the number of pulses emitted from each source is such that the total number of pulses emitted by all objects in the group remains constant, on the average, for the predetermined time interval. By maintaining the number of pulses emitted from all of the objects in the group relatively constant over a predetermined time interval, the number of pulse time coincidences is maintained constant, whereby no changes in the receiver apparatus are necessary as variations in the number of radiation sources in the group occur.

Varying the number of pulses emitted from each object in the group is facile with a radioactive isotope source utilized as a random pulse activation means. The radioactive isotope is coupled to a detector, such as a scintillation detector, through a shield which is arranged so that the shield volume between the radioactive isotope and the detector is varied easily. By changing the shield volume between the isotope and detector, variations in the average number of pulses derived from the detector, within a predetermined time interval, occur. The pulses derived from the detector are fed to a constant width pulse generator that triggers an omnidirectional X-ray source of penetrating radiation.

It is, accordingly, an object of the present invention to provide a new and improved system and method for determining the realtive position of more than two objects in a group.

Another object of the present invention is to provide a new and improved system and method for determining the relative position of more than two objects in a group utilizing, on board a plurality of the objects, pulses of penetrating radiation which occur on the average an equal number of times within a predetermined time interval at random occurrence times whereby jamming of the radiation is obviated.

An additional object of the present invention is to provide a new and improved system and method for determining the relative position of more than two objects in a group wherein no a priori knowledge regarding radiation emission pulse rates and/or occurrence times is required.

Yet another object of the present invention is to provide a system and method for determining the relative position of more than two objects in a group, wherein several of said objects include sources of random penetrating radiation pulses and signal detection means for discarding responses derived when a plurality of said sources are activated simultaneously.

An additional object of the present invention is to provide a system, utilizing a CRT display, for indicating the relative position of more than two objects in a group, wherein the CRT face is blanked except when a definite indication of the location of an object is derived.

Still another object of the invention is to provide a new and improved system for indicating the relative position of more than two objects in a group, wherein each object includes a receiver having a single data processor that is time shared between signals received from the other objects.

A further object of the present invention is to provide a system and method for determining the relative position of more than two objects in a group, wherein the same receiver apparatus can be employed without change regardless of the number of objects in the group.

The above and still further objects, features and advantages of the present invention will become apparent upon consideration of the following detailed description of several specific embodiments thereof, especially when taken in conjunction with the accompanying drawings, wherein:

FIG. 3 is a block diagram of one embodiment of a receiver employed on board the helicopters of FIG. 2;

FIG. 4 is a block diagram of a second embodiment of the receiver employed on board the helicopters of FIG. 1;

FIG. 7 is a circuit diagram of the signal routing network of FIG. 4.

While the invention is described specifically in conjunction with helicopters flying in formation, the principles are applicable to any suitable object location detecting system.

Figure 1:
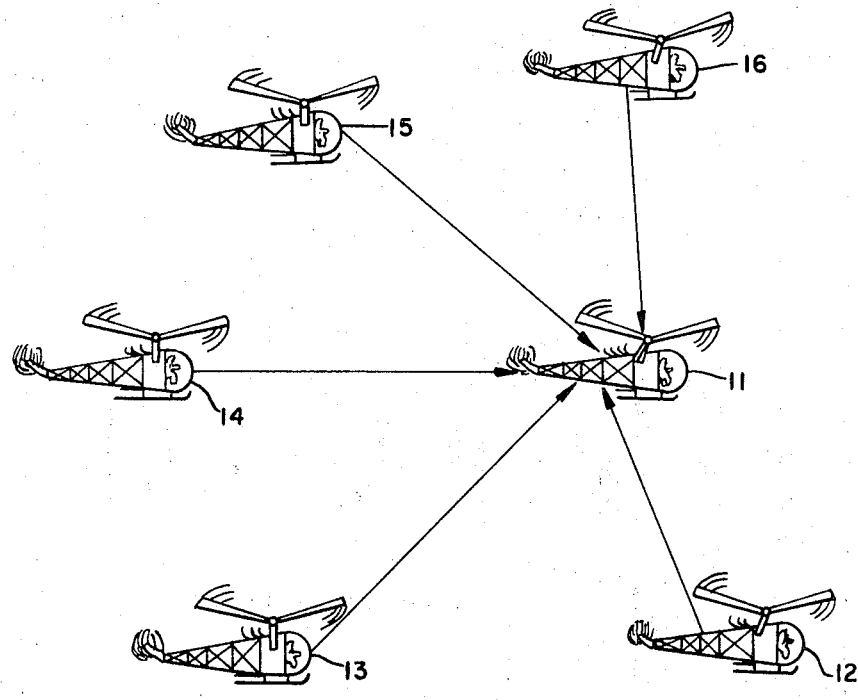
FIG. 1 is an illustration of a plurality of helicopters flying in formation.

Reference is now made to FIG. 1 wherein helicopters 11–16 are illustrated as flying in formation. Helicopters 11–16 are generally not separated from each other by more than 1,000 feet, whereby penetrating radiation is optimumly employed for signalling the range and azimuthal positions between them.

Each of helicopters 11–16 includes a stationary detector of four symmetrically arranged penetrating radiation receivers, as disclosed in the aforementioned Brown application. In addition, each of helicopters 11–16 includes an omnidirectional pulsating source of penetrating radiation, such as X-rays, which is shielded from the detector array on board the particular helicopter. Pulses are emitted from the source on board each helicopter at randomly occurring times, with approximately an equal number of pulses being derived from each source within a predetermined time interval. The X-ray pulses have a duration of approximately one millisecond and are emitted from each of the sources on the average of five times per second, whereby a time-sharing link between the several helicopters comprising the formation is formed. Of course, the one millisecond duration and five pulse per second figures are merely exemplary, as the duration of each pulse can be increased or decreased while the average number of pulses can also be changed as required. Pulses emitted from the source on each of the helicopters in the formation are received by the detectors on other helicopters, processed to derive signals indicative of the range and angular locations of the other helicopters, and displayed on a plan position indicator (PPI) cathode ray tube face mounted on the receiving helicopter.

Because the X-ray source and receiver of each of helicopters 11–16 is identical in construction, the following description is directed solely to the equipment contained on helicopter 11, and it is validly assumed that the same manner of operation applies to the formation keeping equipment contained on the remaining helicopters.

Figure 2:
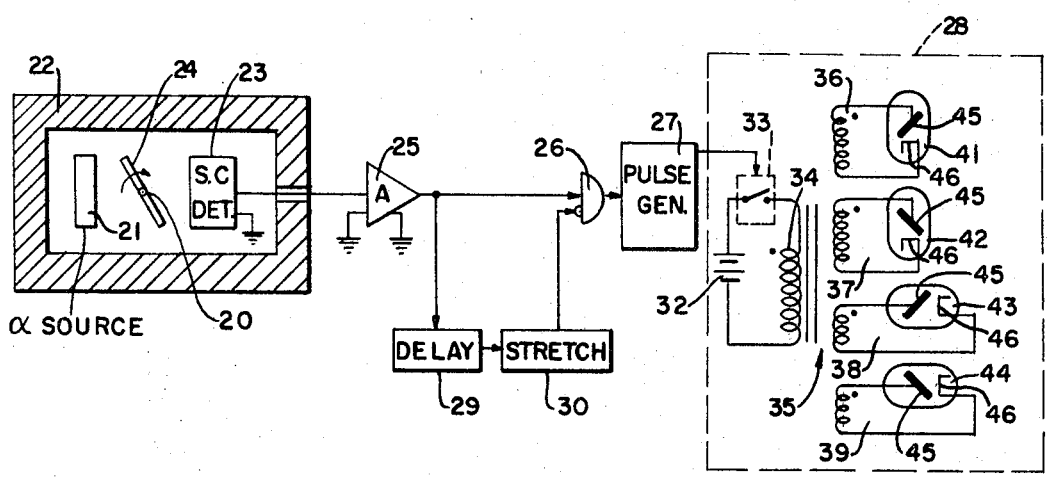
FIG. 2 is a circuit diagram of the penetrating radiation sources employed on each of the helicopters in FIG. 1.

Reference is now made to FIG. 2 of the drawings wherein there is illustrated a preferred embodiment for the penetrating radiation source carried on helicopter 11. The source of FIG. 2 emits, at random time intervals, pulses of X-rays wherein the average number of X-ray pulses is relatively constant over a predetermined time interval. The source comprises radioactive isotope 21, such as an alpha radiation source, that is located in a suitable radioactive shielding container 22. Particles are emitted from alpha source 21 at random time intervals determined by Poisson's distribution, whereby during a predetermined time interval, the number of particles emitted is relatively constant. The particles emitted from alpha source 21 are detected by a detector 23, preferably of the semiconductor type.

The number of electrical pulses derived from the detector 23 is variably controlled by a suitable alpha particle shield 24 that is interposed between radioactive isotope 21 and the detector. Shield 24 is substantially opaque to radiation from source 21, whereby the number of particles from the source impinging on detector 23 may be accurately controlled by varying the shield area interposed between the source and detector. The area of shield 24 in the radiation path between source 21 and detector 23 is changed by rotating the shield about a horizontal axis disposed through the center of the shield. Shield 24 is fixedly mounted on shaft 20 that extends through a bushing in contaiuner 22. The end of shaft 20 for turning shield 24 is braked so that the shield remains in situ until the shaft is rotated by a human operator.

The end of shaft 20 extending through container 22 is connected to a pointer and scale (not shown) that indicate the position for shield 24 as a function of desired pulses corresponding to the number of helicopters in formation and other parameters. For instance, it is desirable that as the number of helicopters in the formation changes, the number of pulses emitted from the radiation source on board helicopter 11 is varied to maintain the total number of pulses emitted by all of the helicopters in the group constant over a predetermined time interval. To this end, shaft 20 is rotated to provide larger and smaller shield areas for the radiation coupled from radioactive isotope 21 and semiconductor detector 23 as the number of helicopters in the formation decreases and increases.

Pulses from scintillation detector 23 are fed to amplifier 25, shown in FIG. 2 exteriorly of container 22. The pulses derived from amplifier 25 are normally fed through inhibit gate 26 to pulse generator 27 that derives pulses of constant amplitude and width (approximately one millisecond) for activating X-ray penetrating radiation source 28.

If two pulses from amplifier 25 should be derived within a predetermined time interval that is less than the recovery time of X-ray source 28 from a previous pulse, pulse generator 27 is not activated, and the X-ray source is not pulsed within the interval. Activation of pulse generator 27 repeatedly within the interval is prevented by feeding the output of amplifier 25 to delay network 29 that is cascaded with stretching network 30, preferably a one-shot multivibrator. The delay introduced by network 29 is slightly greater than the maximum time duration of each pulse derived by amplifier 25 (approximately 10 microseconds) so that stretcher 30 is not energized prior to the termination of a pulse from amplifier 25. In response to each input pulse coupled to stretching network, there is derived a constant width output pulse that is fed to inhibit gate 26 to prevent the gate from passing pulses from amplifier 25 during the time interval required for X-ray source 28 to recover from an activation pulse from generator 27, approximately 10 milliseconds.

X-ray source 28 comprises stabilized D.C. voltage source 32, connected via normally open pulse activated switch 33 to the primary winding 34 of transformer 35. Transformer 35 includes four parallel secondary windings 36–39, each being wound in the same direction so that a positive voltage is induced in the dotted ends thereof in response to source 32 being connected to primary 34 when switch 33 is closed during the occurrence of a one millisecond pulse from generator 27.

To derive X-ray pulses covering a 360° field, whereby the source can be considered as omnidirectional, four X-ray tubes 41–44 are provided and connected across secondary windings 36–39, respectively. The anodes 45 of tubes 41–44 are positioned orthogonally relative to each other to enable the 360° field to be covered. Cathodes 46 of tubes 41–44 have indirectly heated filaments (not shown) that are supplied with constant D.C. voltages. By maintaining the filment and anode-cathode voltages of tubes 41–44 constant during an activation interval, the same amount of X-ray radiation is derived from source 28 each time that it is supplied with an energizing pulse from generator 27, whereby the source is a calibrated penetrating radiation source. As disclosed in the copending Brown application, it is necessary for source 28 to be calibrated to determine range between the several helicopters in the formation accurately.

Reference is now made to FIG. 3 of the drawings wherein there is illustrated one preferred embodiment of the signal detection and object location display system utilized in one embodiment of the present invention. The detector array is fixedly mounted relative to helicopter 11 and comprises four symmetrically arranged scintillation detecting crystals 51–54, having radiation shields 55 disposed between them. The arcuate edges of crystals 51–54 at right angles to the plane of the paper, as illustrated in FIG. 3, are responsive to radiation from the sources contained on board helicopters 12–15. The shield 55 separating detectors 51 and 54 is considered as lying along the axis of the array wherein $\theta$, the azimuth angle between helicopter 11 and the other helicopters, is zero.

Crystals 51–54 and shield 55 are arranged so that the crystal receivers on the far side of a radiation source are shadowed, whereby they receive a lesser amount of energy than those crystals which are exposed directly to the source. As shown in the copending application of Brown, the relative count rate or signal level detected by each of crystals 51–54 is a sinusoidal or periodic function with respect to the angle $\theta$. Hence, if helicopter 12 is assumed as being positioned at an angle $\theta=45°$ relative to the detector array on board helicopter 11, maximum radiation impinges on detector 51, equal amounts of radiation impinge on detectors 52 and 54, and the lowest radiation level is coupled to detector 53.

Each of detectors 51–54 is coupled to a photomultiplier that derives electrical output pulses having a signal level commensurate with the amount of radiation flux impinging on the respective crystal. The output of each photomultiplier is fed to a separate signal processing network 56, or the type disclosed specifically in the copending Brown application. Signal processing networks 56 derive D.C. analog output signals $C_1$, $C_2$, $C_3$ and $C_4$, varying in magnitude in accordance with the amount of energy impinging on each of scintillation crystals 51, 52, 53 and 54, respectively.

The outputs of signal processing networks 56 are linearly combined in summing network 57 and difference networks 58 and 59, whereby the networks respectively derive signals proportional to:

$$e_{o57} = B_1' = C_1 + C_2 + C_3 + C_4 \qquad (1)$$

$$e_{o58} = B_1' \sin \theta = (C_1 - C_2) + (C_3 - C_4) \qquad (2)$$

$$e_{o59} = B_1' \cos \theta = (C_1 - C_2) - (C_3 - C_4) \qquad (3)$$

where:
$e_{o57}$, $e_{o58}$ and $e_{o59}$ are the output voltages of networks 57, 58 and 59, respectively; and
$B_1'$ is the average radiation level impinging on receivers 51–54 from one of the sources.

The effect of background radiation impinging on the array comprising receivers 51–54, i.e., the radiation impinging on the receiver array when none of the sources on board helicopters 12–15 is transmitting, is eliminated in combining network 57 in the same manner as disclosed in the copending application of Krause and, because of the substraction operations, is not a factor in the outputs of networks 58 and 59.

The variable amplitude pulses derived from combining networks 57–59 have a width approximately equal to the duration of the ON time of a transmitting radiation source on board one of helicopters 12–15. These pulses generally have a duration of approximately one millisecond and relatively steep leading and trailing edges so that they can be considered as substantially rectangular pulses of variable amplitude and constant width.

The variable amplitude and constant width pulses derived from combining networks 57–59 are applied to data processor 61, disclosed specifically in the copending Krause application. Data processor 61 responds to its three input signals to derive, on output lead 62, a narrow pulse (of approximately one microsecond duration) having an occurrence time, relative to the leading edge of the $B_1'$ pulse applied thereto, proportional to the range of the helicopter from helicopter 11 that emitted the radiation pulse and inversely proportional to the magnitude of the output derived from combining network 57. Range is related to the magnitude of the average radiation level impinging on receivers 51–54, $B_1'$, approximately in accordance with:

$$B_1' = \frac{Ke^{-\frac{\lambda}{R}}}{R^2} \qquad (4)$$

where
K is a constant;
$e$ is the base of natural logarithms;
R is range; and
$\lambda$ is an attenuation constant for the penetrating radiation.

Data processor 61 integrates the output signals of networks 58 and 59 to derive, on leads 63 and 64, sawtooth voltages having slopes proportional to $B_1' \sin \theta$ and $B_1' \cos \theta$, respectively. The sawtooth voltages on leads 63 and 64 commence approximately simultaneously with the leading edge of the $B_1'$ pulse applied to data processor 61, whereby the signals developed on leads 63 and 64 can be considered as proportional to $B_1' \sin \theta$ and $B_1' \cos \theta$, respectively.

The signals developed by data processor 61 on leads 62–64 are applied to cathode ray oscilloscope 65, a plan position indication (PPI) visual display of the relative position between helicopter 11 and the helicopter that emitted the radiation pulse that caused the signals to be derived. Cathode ray tube 65 has a phosphorescent face 66 which provides a light spot indicative of the integral of signals applied to any position on the face of the tube. If a particular position on face 66 is energized repeatedly within a predetermined time interval, a spot is developed at that location but if a particular location is activated only one within the interval, no visual indication is derived. For use with a helicopter formation keeping system, the phosphor is such that a particular location on face 66 must be activated with the cathode ray beam at least twice within a one second interval to provide a sharp visual display at that point. Because of the integrating nature of the phosphorescent face 66, cathode ray tube 65 is considered as being a storage or memory device for the target location signals derived from data processor 61.

The signals applied to cathode ray tube 65 by data processor 61 are such that the voltages on leads 63 and 64 are respectively applied to the horizontal and vertical deflection plates of the CRT, the X and Y inputs, while the pulse on lead 62 is applied to the normally cut-off electron beam source of the tube, the Z input. In response to the derivation of a pulse on lead 62, the position indicating voltages on leads 63 and 64 deflect the cathode ray beam of tube 65 to a location on face 66 indicative of the location of the emitting source. Since the cathode ray beam is switched ON at a time $$t = \frac{B_1'}{R}$$

the beam is directed to a spot indicative of $R \sin \theta$ and $R \cos \theta$, the position of the emitting source. This relationship is derived by substituting the value $$t = \frac{B_1'}{R}$$

into the $B_1' t \sin \theta$ and $B_1' t \cos \theta$ voltages applied to leads 63 and 64.

If the number of helicopters in the formation increases so that the average number of pulses derived from the radiation source on board each helicopter decreases to less than, e.g., two per second, the integrating, or memory, time of face 66 is increased. Increasing the effect of each pulse on phosphorescent screen 66 is accomplished by connecting output lead 62 of data processor 61 through potentiometer 67 to the Z input of cathode ray tube 65. As the number of helicopters in the formation increases beyond the limit, the position of the potentiometer slider is adjusted so that a greater percentage of the voltage developed on lead 62 is applied to the normally cut-off grid at the Z input of CRT 65. Thereby, the electron beam is accelerated with greater velocity in response to each pulse derived from data processor 61 than when the number of helicopters is less than the limit. Increasing the velocity of the electron beam impinging on phosphorescent face 66 causes a greater quantity of light to be emitted and the phosphorescent face storage time is increased.

To provide a better understanding of the manner in which the apparatus of FIG. 3 functions, a number of examples will be considered. In the first example, it is assumed that helicopter 12, located at range $R_{12}$ and azimuth $\theta_{12}$ from helicopter 11, emits radiation pulses for one millisecond. The pulses occur from the source on helicopter 12 at random times, just as pulses are emitted at random times for any of the other helicopters 13–16, on the average of, e.g., five occurrences per second. The pulses emitted from helicopter 12 are detected on board helicopter 11 by the array comprising receivers 51–54, are fed through signal processor 56, combining networks 57–

59 and data processor 61. Data processor 61 derives, on lead 62, one microsecond pulses at times $$t = \frac{R_{12}}{B_{12}}$$

relative to the leading edges of the one millisecond pulse fed thereto, where $B_{12}'$ is the average radiation level of the detector array in response to energy from the source on helicopter 12. Simultaneously with the leading edges of the one millisecond pulses applied to data processor 61, there are instigated on leads 63 and 64 sawtooth voltages having slopes proportional to $B_1'\sin\theta_{12}$ and $B_1'\cos\theta_{12}$. The signals developed on leads 63 and 64 are displayed five times during each second at the spot $R_{12}$, $\theta_{12}$, whereby a light image is developed at the point $R_{12}$, $\theta_{12}$.

In a similar manner to that described for helicopter 12, radiation from helicopters 13–16 causes four additional spots to be developed on the face 66 of CRT 65 at points $R_{13}$, $\theta_{13}$; $R_{14}$, $\theta_{14}$; $R_{15}$, $\theta_{15}$, and $R_{16}$, $\theta_{16}$.

After the spots at the four positions for the four helicopters $R_{12}$–$R_{15}$ have been developed on face 66, let it be assumed that helicopters 12 and 13 simultaneously emit a radiation pulse. In response to the time coincidence radiation pulses emitted by helicopters 12 and 13, the signals picked up by receivers 51–54 are different from those radiation levels which are detected when only one of the sources on board the several helicopters is emitting radiation. In response to the different signals derived from receivers 51–54, data processor 61 develops signals on at least two of its output leads that are different from those signals that are derived from non-time coincident pulse derivation from helicopters 12–15. Since at least two of the signals developed on leads 62–64 are different, the cathode ray beam of CRT 65 is deflected to a place on face 66 that is different from the spots where the locations of targets 12–15 are displayed.

If it is assumed, for example, that the radiation sources on helicopters 12 and 13 are in time coincidence, the $B_1'$ signal derived from summing network 57 has an amplitude proportional to $B_{12}'+B_{13}'$, while the azimuth indicating signals derived from networks 58 and 59 are a function of the angle between helicopters 12 and 13 and the sum of the distance of the two sources from helicopter 11. These signals are fed through data processor 16 to deflect the cathode ray beam of CRT 65 to a point $R_e$, $\theta_e$ on the face of phosphorescent face 66.

Because of the random occurrence times of pulses from the sources on helicopters 12 and 13 there is an extremely low probability that the sources will be in time coincidence more than once within the half-second memory time of face 66. Since the $R_e\theta_e$ spot on face 66 is not reinforced within the memory time the time coincident signal is not displayed as a sharply defined light spot and no erroneous indication is provided on the face of cathode ray tube 65.

The simultaneous occurrence of pulses from the sources on helicopters 12 and 13 means that the spots $R_{12}$, $\theta_{12}$ and $R_{13}$, $\theta_{13}$ are not activated when the spot $R_e$, $\theta_e$ is activated, whereby the number of $R_{12}$, $\theta_{12}$ and $R_{13}$, $\theta_{13}$ spot activations is reduced. Reducing the number of $R_{12}$, $\theta_{12}$ and $R_{13}$, $\theta_{13}$ spot activations, however, does not materially affect the presentation of PPI cathode ray tube 65 because each spot is activated a sufficient number of times, on the average during a one second time interval, to maintain light emission from a particular location on phosphorescent face 66 substantially constant.

While the display of FIG. 3 is satisfactory for many purposes, the target indicating spots on phosphorescent face 66 are sometimes difficult to perceive in an environment of high level ambient light. The spots may be difficult to recognize in such an environment because the background of face 66 has a tendency to be maintained at a relatively bright level in response to time coincidence of the several pulse sources on board helicopters 12–15. As the number of helicopters in the formation increases, this problem is aggravated because each pulse must produce a greater effect on the phosphorescent screen 66. To obviate these disadvantages, the more complex system, illustrated in block diagram form by FIG. 4, was developed.

The system of FIG. 4 comprises a detecting array including receivers 51–54 and shield 55, signal processing network 56 and combining networks 57–59, substantially the same as the system of FIG. 3. Each of the output signals of networks 57–59 is applied to a separate holding network 71. Holding or storage networks 71 derive an output signal having the same amplitude as the last input pulse applied thereto. In response to a new input pulse being applied to holding networks 71, the holding network derives a new D.C. output level, whereby the waveform derived from each holding network is considered as a series of D.C. voltage levels having lengths equal to the time between the reception of adjacent pulses by the detecting array comprising receivers 51–54. The signals from holding network 71 are applied in parallel to signal routing circuit 72 and a plurality of target classifying networks 73.1–73.6. For purposes of illustration, six target classifying networks 73.1–73.6 are illustrated.

Target classifying networks 73.1–73.6 respond to the output signals of holding networks 71 and signal routing networks 72 to determine if the voltages derived from holding networks 71 are approximately the same as the voltage levels derived for a previously received radiation pulse. If, for example, the average values of the three signals stored in target classifying network 73.1 are approximately the same as the corresponding voltages derived from holding networks 71, routing network 72 is activated so that the signals in holding networks 71 are applied to target classifying network 73.1. If, on the other hand, none of target classifying networks 73.1–73.6 stores signals having average values equal to the magnitude of the voltages derived from holding networks 71, the voltages in holding network 71 are not routed to any target classifying network and it is presumed that the signals in holding network 71 are derived as a result of sources on board two of the helicopters being activated simultaneously. The number of target classifying networks must be at least equal to, and is preferably greater than, the maximum number of helicopters expected in a formation so that "true" target indicating signals are not eliminated.

To load the memories or storage elements in target classifying networks 73.1–73.6 initially, circuitry is provided in the target classification networks and signal routing network 72 to direct signals from holding networks 71 to an unoccupied memory within the target classification networks.

To prevent erroneous information derived in response to a pair of radiation sources being simultaneously activated from being stored, each of the memories in target classifying networks 73.1–73.6 is continuously updated to remove data stored longer than a predetermined time interval. Updating data, in addition to preventing storage of erroneous simultaneous pulse occurrences for long durations, enables the system to handle signals from helicopters moving substantially within the formation, leaving the formation and entering the formation.

If a plurality of range and azimuth signals has approximately the same values within a predetermined time interval, the system functions on the assumptions that these signals accurately represent the position of one of the helicopters 12–16. After a predetermined number of similarly valued signal pulses have been accumulated in each of the target classifying network memories during a predetermined time interval, the signals are gated to deflection control network 74 which feeds cathode ray tube 65.

Deflection control network 74 is essentially the same at data processor 61, FIG. 3, whereby it derives, on lead 62, a one microsecond pulse having an occurrence time $$t = \frac{R}{B_1'}$$

Deflection control network 74 derives sawtooth voltages on leads 63 and 64 having slopes respectively proportional to $B_1'$ sin $\theta$ and $B_1'$ cos $\theta$. The signals derived on leads 62–64 are applied to the normally cut-off grid, X deflection plates and Y deflection plates of cathode ray tube 65, respectively. Phosphorescent face 66 of cathode ray tube 65, having a relatively long storage time, emits a light spot each time that a pulse is generated on lead 62. Thereby, a viewer of the phosphorescent face 66 is provided with an instantaneous indication of the signals derived from target classifying networks 73.1–73.6.

Figure 5:
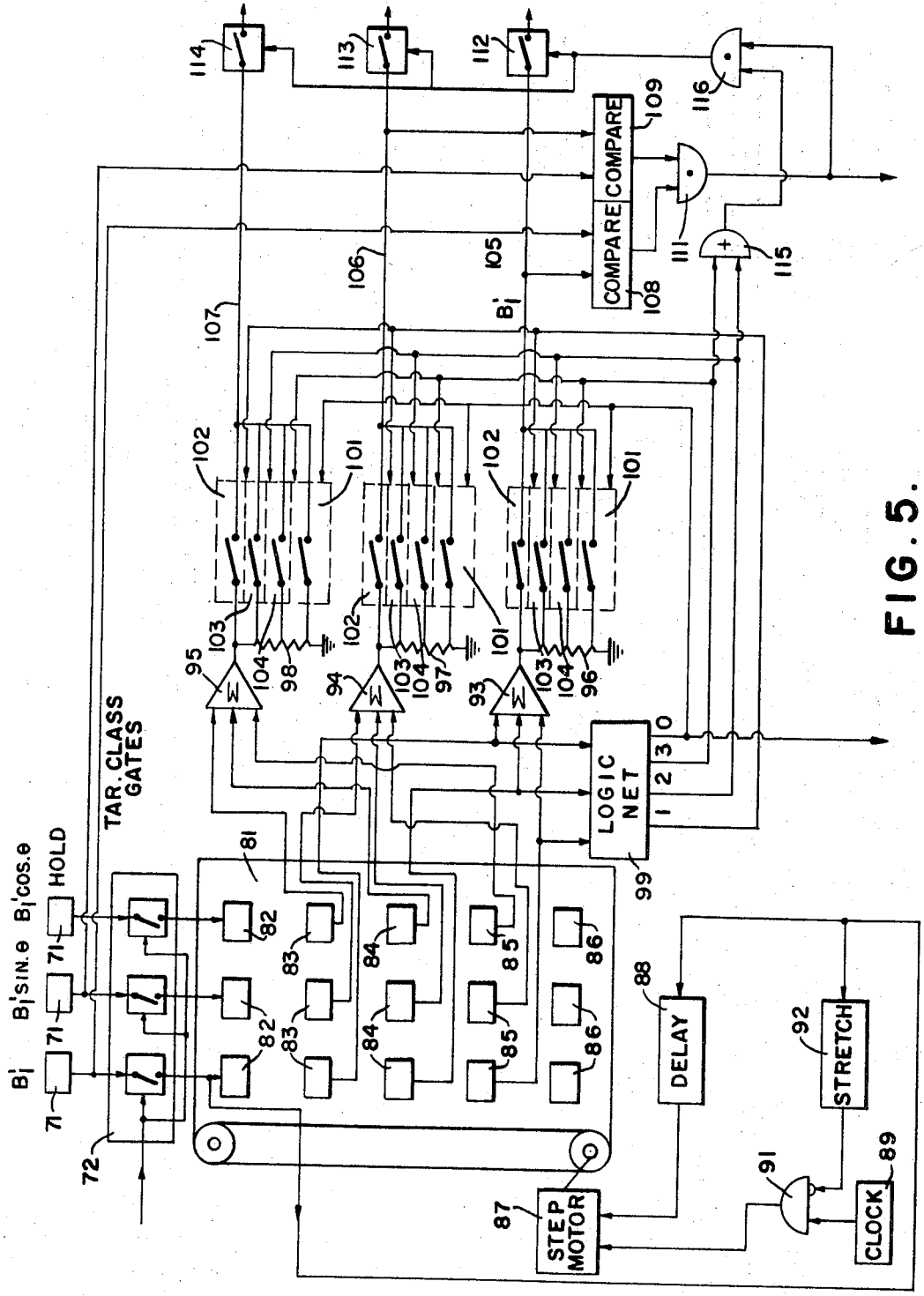
FIG. 5 is a circuit diagram of the target classifiers employed in the receiver of FIG. 4.

Reference is now made to FIG. 5 of the drawings wherein the target classifying networks 73.1 of FIG. 4 is specifically illustrated. Target classifying network 73.1 comprises an intermittently driven magnetic three-channel tape 81. Magnetic tape 81 stores the $B_1$, $B_1'$ sin $\theta$ and $B_1'$ cos $\theta$ signals gated to read-in heads 82 through signal routing network 72. Positioned downstream of read-in heads 82, and equally spaced along the length of tape 81, are read-out heads 83–85 which are followed by erase heads 86. Heads 82–85 are aligned in three columns to provide three storage tracks or channels on tape 81 for the $B_1'$, $B_1'$ sin $\theta$ and $B_1'$ cos $\theta$ signals respectively.

All of heads 83–85 are of the Hall plate type wherein the actual values of the magnetic signal levels are read out of tape storage 81. It is necessary to employ Hall plates, rather than conventional recording techniques, because the tape is not moved during the read-out operation.

Step motor 87 longitudinally translates tape 81 relative to heads 82–86. Circuitry is provided for step motor 87 so that record 81 is translated a predetermined distance each time that a voltage level is fed from hold network 71 to read-in head 82. Step motor 87 also translates record 81 between adjacent heads on a periodic basis if no signal is fed to read-in heads 82 within a predetermined time period. To these ends, the $B_1'$ signal applied to read-in head 82 is fed in parallel with the head through delay network 88 to step motor 87. The delay introduced by network 88 is sufficient to enable signals to be recorded on record 81 by heads 82 prior to activation of step motor 87. In response to the leading edge of the output pulse developed by delay network 88, step motor 87 translates record 81 by a fixed distance equal to the distance between heads 82 and 83. Thereby, the signal levels fed to read-in heads 82 indicative of the range and azimuthal location of a helicopter in the formation are stored and the memory is advanced so that these signals can be read out into data processing equipment. In response to the next radiation pulse that was of approximately the same magnitude as previously stored pulses on record 81, step motor 87 is again activated and the data previously stored beneath read-out heads 83 is translated to read-out heads 84.

If no signal level having approximately the same magnitude as the average values of the signal levels stored on the three chanels of tape 81 is derived from holding networks 71 within a predetermined time period, such as 500 milliseconds, step motor 87 is activated in response to a pulse from clock pulse source 89. By stepping motor 87 every 500 milliseconds, memory 81 is updated and only reinforced signals are stored therein for any considerable period. Clock pulse source 89 has a repetition rate of approximately two cycles per second, but is decoupled by inhibit gate 91 from step motor 87 when pulses are being supplied to read-in heads at a rate in excess of once every one-half second.

The inhibit input of gate 91 is responsive to the $B_1'$ voltage level applied to record 81 by hold network 71. The $B_1'$ pulse is applied to stretching network 92, the output of which feeds the inhibit terminal of gate 91 to prevent pulses from clock source 89 from normally being fed to step motor 87. Stretching network 92 converts each of the $B_1'$ pulses fed to it into a constant amplitude positive voltage level that lasts for one-half second after each occurrence of a $B_1$ input pulse applied thereto. If $B_1'$ input pulses are applied to stretching network 92 repeatedly within one-half second intervals, the positive constant amplitude output voltage of the stretcher is maintained. As long as a positive output voltage is derived by stretching network 92 and applied to the inhibit input terminal of gate 91, pulses from clock 89 are prevented from reaching step motor 87 and the step motor is exclusively under the control of the rate at which $B_1'$ pulses are fed to read-in head 82 of record 81.

To derive the average values of the three signals stored in each of the tracks of record 81, as is necessary to control information fed to the memory, the signals picked up by read-out heads 83–85 of a single track are fed to a summing amplifier, whereby summing amplifier 93 responds to the $B_1'$ signals picked up by read-out heads 83–85 in the first channel, summing amplifier 94 responds to the $B_1'$ sin $\theta$ signals in the second track, and summing amplifier 95 combines the $B_1'$ cos $\theta$ signals of the third track. The output of each summing amplifier 93, 94 and 95 is fed to a separate resistance divider 96, 97, and 98, respectively. Each of resistances 96–98 is provided with four taps, whereby the output voltages of the corresponding summing amplifiers can be completely attenuated, attenuated by one-third, one-half, or not attenuated at all, to provide division by a factor equal to the number of longitudinal positions holding data. Thereby, the actual average value of each stored signal is derived.

To derive an indication of the number of longitudinal positions holding data, logic network 99 is responsive to the $B_1'$ signals picked up by read-out heads 83–85. Logic network 99 is provided with four output leads to indicate whether zero, one, two or three of the longitudinal positions beneath the $B_1'$ read-out heads 83–85 are storing finite signal values. When activated, the zero, one, two and three output signal leads of logic network 99 close normally open switches 101–104 connected to the taps on resistors 96–98.

The normally open circuited contacts of switches 101–104 across each of the resistors 96–98 are connected to a common point, the common point being different for each of the sets of switches, whereby there is developed at the common point a voltage precisely proportional to the average value of the variable input signals fed to the respective summing amplifiers, regardless of the number of read-out heads having finite signals impressed thereon. For example, if finite $B_1'$ signals are impressed on read-out heads 83 and 84, and zero voltage is derived from read-out head 85 because the system just began to operate and no voltage was impressed on the $B_1'$ read-in head 82 more than one second ago, the "two" output signal lead of logic network 99 is activated. Simultaneously, finite input signals are applied to only two of the three inputs of each of summing amplifiers 93–95. In response to activation of the logic network 99 output lead associated with two read-out heads deriving finite voltages, switches 103 connected to taps on each of resistors 96–98 are activated. Closing of the switches 103 divides the output signals of summing amplifiers 93–95 by a quantity proportional to two, whereby there is derived on lead 106 a voltage having a value equal to one-half of the sum of the two signals read out by the heads 83 and 84 responsive to the $B_1'$ signal. Similarly, there are derived on leads 106 and 107 signals equal to the average values of the $B_1'$ sin $\theta$ and $B_1'$ cos $\theta$ signals being read out by heads 83 and 84.

To determine if the signal magnitudes stored in holding networks 71 are commensurate with the signal magnitudes stored on record 81, i.e., to determine if the signal in holding network 71 is derived from the same target as the target data stored in record 81, the signals on leads 105 and 106 are respectively compared with the $B_1'$ and $B_1'$ sin $\theta$ signals in hold networks 71. The determination is made in conventional comparison networks 108 and 109, repsectively, responsive to the $B_1'$ and $B_1'$ sin $\theta$ signals on leads 105 and 106 and from holding network 71.

Comparison networks 108 and 109 derive a binary one output signal level if their input voltages have approximately the same value, that is, values within 5% of each other. If the inputs of comparison networks 108 and 109 deviate by more than 5%, the networks derive binary zero output signals. The outputs of comparison networks 108 and 109 are fed to AND gate 111, which derives a binary one output in response to both of its inputs being simultaneously in a binary one state.

Hence, AND gate 111 derives a positive binary one voltage level only when the signal in hold networks 71 have approximately the same values as the average stored signals derived on leads 105 and 106. It is necessary to compare only two of the target position indicating signals, rather than all three, because a target location is uniquely defined by the sum of the responses of all of the detectors and one of the difference functions. The other difference functions, associated with $B_1'$ cos $\theta$, is utilized for activating the cathode ray tube display but is not required for determining if a particular signal is like a previously stored signal.

Signals derived from memory 81 are not applied to deflection control network 74, FIG. 4, unless they repeatedly have the same value within a predetermined time interval. To this end, the signals on leads 105–107 of target classification network 73.1 are respectively gated through normally open switches 112–114 to deflection control network 74, only after approximately the same magnitudes have been applied to the three recorder channels of tape 81 at least twice within a one second time interval. To determine if switches 112–114 are to be opened or closed, the outputs of logic network 99 associated with two or three longitudinal positions of recorder 81 having information stored therein are fed to OR gate 115. If the "two" or "three" level outputs of logic network 99 are activated to derive a binary one level output, there is derived a binary one output from OR gate 115 that is combined with the output of AND gate 111 in AND gate 116. AND gate 116 thereby derives a binary one output level only in response to logic network 99 being activated to its "two" or "three" level output, while an input signal in hold networks 71 has approximately the same value as previously stored values on record 81. In response to such an occurrence, the binary one output voltage level of AND gate 116 closes each of normally open switches 112–114 to feed the average values of the stored $B_1'$, $B_1'$ sin $\theta$ and $B_1'$ cos $\theta$ signals to deflection control network 74.

It has been previously assumed that storage medium 81 always has data stored therein. As will be shown infra in conjunction with FIG. 7, signal routing network 72 is provided with means to gate signals in hold networks 71 to magnetic tape read-in heads 82 when storage medium 81 has no data stored therein. In such an instance, the zero output level of logic network 99 feeds a signal to signal routing network 72 to enable voltages from the hold networks to be fed to read-in heads 82. It will also be shown infra how, in a different manner, control voltages from AND gate 111 are fed to signal routing network 72 to control the flow of data from hold networks 71 to read-in heads 82 when the outputs of comparison networks 108 and 109 indicate that the average value of signals in record 81 are approximately equal to the signal magnitudes in the hold networks.

Figure 6:
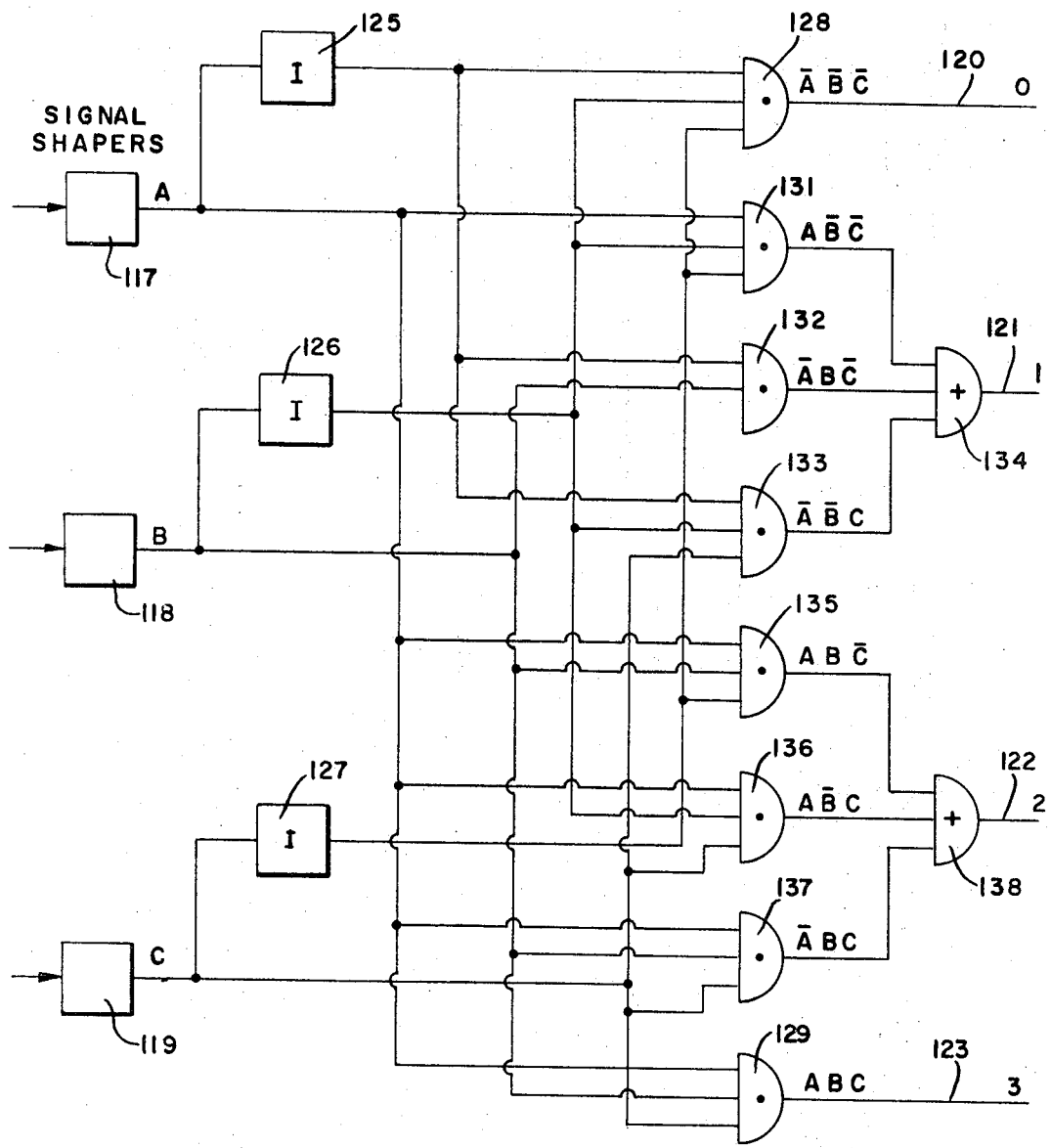
FIG. 6 is a circuit diagram of the logic network employed in FIG. 5.

Reference is now made to FIG. 6 wherein there is illustrated a circuit diagram for logic network 99, FIG. 5. The logic network of FIG. 6 responds to the $B_1'$ output signals from read-out heads 83–85 which derive a binary one output voltage on one of four leads indicative of whether none, one, two, or all of read-out heads 83–85 are sensing voltages. The signals from the $B_1'$ read-out heads 83–85 are fed to signal shapers 117–119, respectively. Signal shapers 117–119 are amplifying clippers which derive constant voltage binary one D.C. outputs if any finite voltage is applied thereto. If, however, a zero input voltage is applied to one of signal shapers 117–119, that signal shaper derives a zero level output signal. Hence, the signals derived from shapers 117–119 are binary ones and zeros having values indicative of the number of $B_1'$ signals being sensed by heads 83–85. The signals derived from shapers 117–119 are denominated as A, B, and C, respectively.

The remaining portion of the logic network of FIG. 6 combines the A, B and C output signals of shapers 117–119 to derive binary ones on the zero, one, two and three indicating output leads 120–123, respectively, in accordance with:

Table I $0 = \overline{ABC}$
$1 = A\overline{BC} + \overline{A}B\overline{C} + \overline{AB}C$
$2 = AB\overline{C} + A\overline{B}C + \overline{A}BC$
$3 = ABC$ From Table I it is noted that the zero indicating output lead 120 is supplied with a binary one signal level only when all of the outputs of signal shapers 117–119 have a binary zero level, while the converse is true for the derivation of a binary one level on lead 123. A binary one signal is derived on lead 121 in response to only one of the signals from shapers 117–119 being in a binary one state while lead 122 has a binary one signal applied to it only if two of the three signal shapers derive binary one signals.

The apparatus employed for mechanizing the equations of Table I comprises a plurality of inverter gates 125–127, respectively responsive to the binary signals derived from signal shapers 117–119. Inverters 125–127 reverse the polarity of their input signals so that they derive a binary one output level in response to a binary zero signal being applied thereto and vice versa in response to a binary one input signal.

The $\overline{A}$, $\overline{B}$ and $\overline{C}$ output signals derived from inverters 125, 126 and 127, respectively, are combined in AND gate 128 which feeds the zero indicating output lead 120. Similarly, the A, B and C output signals of shapers 117–119 are applied directly to AND gate 129, having an output connected to lead 123 which carries a positive voltage when each of read-out heads 183–185 senses a positive voltage.

The outputs of signal shapers 117–119 and inverter gates 125–127 are fed to AND gates 131, 132 and 133 which derive binary signals having values in accordance with $A\overline{BC}$, $\overline{A}B\overline{C}$ and $\overline{AB}C$, respectively. The binary signals derived from AND gates 131–133 are fed to OR gate 134, the output of which is connected to lead 121, whereby lead 121 carries a binary one signal in response to only one of the signals A, B or C having a binary one value. The outputs of signal shapers 117–119 and inverting gates 125–127 are also combined in AND gates 135, 136 and 137 which respectively derive signals commensurate with $AB\overline{C}$, $A\overline{B}C$ and $\overline{A}BC$. The binary signals generated by gates 135–137 are combined in OR gate 138, the output of which supplies lead 122 with a binary one signal in response to only a pair of the signal shapers 117–119 deriving binary one signals.

Reference is now made to FIG. 7 of the drawings wherein there is illustrated one embodiment of the circuitry for signal routing network 72, FIG. 4. The general purpose of signal routing network 72 is to feed the signal or voltage levels in hold networks 71 to an appropriate one of target classifying networks 73.1–73.6. If the signals in hold networks 71 correspond with stored signals in one of the target classifying networks, signal routing network 72 feeds the signals in the hold networks to that target classifying network. On the other hand, if the signals in hold networks 71 are not approximately the same as the stored signals in any of the target classifying networks, signal routing network 72 feeds the voltages in the hold networks to a target classifying network that has no signals in its storage. If each of the target classifying networks is storing signals and the input signals to routing network 72 are not approximately equal to any of the stored signals, the routing network inputs are discarded.

The $B_1'$, $B_1' \cos \theta$ and $B_1' \sin \theta$ signals in hold networks 71 are respectively applied to the armatures 141–143 of double pole-single throw switch matrix 145 that is controlled in response to a voltage applied to it on lead 146. Switch matrix 146 is such that its armatures 141–143 normally engage contacts 147–149, respectively, and the armatures are activated into engagement with contacts 151–153 only in response to a positive voltage being applied to lead 146. While switch 145 is illustrated as being of the mechanical type, it is to be understood that it, as well as the other switches illustrated in FIG. 7, is actually an electronic device that is illustrated merely for convenience as of the mechanical variety.

A positive voltage is developed on lead 146 to switch armatures 141–143 into engagement with contacts 151–153, respectively, if any of the target classifying networks 73.1–73.6 signals that the voltages in hold networks 71 correspond with the average values of the signals stored on memory 81 thereof. To this end, the output of the AND gate 111 in each target classifying network 73.1–73.6 is applied to OR gate 154, the output of which is fed to switch 145 to control armatures 141–143 via lead 146. Armatures 141–143 are also energized into engagement with contacts 151–153 in response to each of the target classifying networks 73.1–73.6 storing at least one signal in the memories thereof. To maintain armatures 141–143 in engagement with contacts 151–153 during the entire interval when all of the target classification network memories are storing signals, whereby repeated activation of switch 145 is not necessary once the system has begun operation generally, the zero level output of the logic network 99 in each target classification network 73.1–73.6 is applied to NAND gate 155. In response to a binary zero being derived on the zero level output of each of logic networks 99, NAND gate 155 derives a binary one signal that is fed through OR gate 154 to lead 146, to activate armatures 141–143 into engagement with contacts 151–153.

The signals on contacts 147–149 and 151–153 of switch 145 are selectively routed to target classification networks 173.1–173.6 via six pairs of switching networks. For purposes of simplifying the drawing, only three pairs of switching sets are illustrated, namely those for routing signals to target classification networks 73.1, 73.2 and 73.6. Since the switching circuits for the remaining target classification networks are identical to those illustrated, there is no need to illustrate them specifically.

The switches are arranged so that the signals on contacts 147–149 are fed to the armatures 156–158 of switches 161–163, while contacts 151–153 supply voltages selectively to contacts 164–166 of switches 167–169. The normally open circuited armatures of each of switches 161–163 and 167–169 are closed in response to a positive voltage being derived on leads 171–176, respectively. The switches are arranged in pairs so that target classification network 73.1 is responsive to signals derived from switches 161 and 171, target classification network 73.2 is selectively supplied with signals from switches 162 and 168, while target classification network 73.6 is fed with signals from switches 163 and 169. The contacts of each of these switch pairs are arranged so that the terminals selectively responsive to the $B_1'$ signals are connected together, the terminals selectively responsive to the $B_1' \cos \theta$ signal are connected together, while the terminals selectively responsive to the $B_1' \sin \theta$ signals are connected together.

Switches 167, 168 and 169 are selectively closed in response to binary one output signals derived from AND gates 111 of target classification networks 73.1, 73.2 and 73.6, respectively. If, for example, the $B_1'$ and $B_1' \sin \theta$ signals in hold networks 71 are approximately equal to the signals developed on leads 105 and 106 in target classification network 73.2, AND gate 111 of target classification network 73.2 develops a binary one signal that is fed via lead 175 to switch 168, closing armatures 164–166. Simultaneously, the binary one signal from AND gate 111 is fed through OR gate 154 to activate switch 145 so that armatures 141–143 engage contacts 151–153, whereby the $B_1'$, $B_1' \cos \theta$ and $B_1' \sin \theta$ signals are fed to read-in heads 82 of memory 81 incorporated in target classification network 73.2. In a similar manner, the armatures of switches 167 and 169 are activated in response to the voltages in hold networks 71 corresponding approximately with the average values of signals stored in the memories of target classification networks 73.1 and 73.6.

Consideration is now given to the manner in which binary one activating signals are selectively derived on leads 171–173 to route signals to one of classification networks 73.1–73.6 if the voltages in hold networks 71 do not have approximately the same value as the average values stored in the memories of any of the classification networks that have signals loaded therein and if one of the memories of the target classification networks is available, i.e., is not storing any signals. To control switches 161–163 and feed signals to available target classification network memories, the zero level outputs of logic networks 99, in target classification circuits 73.1–73.6, are fed to unused memory selector network 181.

Unused memory selector network 181 is constructed so that the lowest number target classification network having no signals stored therein is coupled to holding networks 71. For example, if target classification network 73.1 has signals stored in the memory 81 thereof, but target classification network 73.2 has no signals stored therein, while target classification network 73.3 also has no signals stored therein, target classification network 73.2 is supplied with signals from hold networks 71.

To establish these criteria, unused memory selector network 181 includes a lead for coupling the zero level output signal of logic network 99 in target classification network 73.1 directly to lead 171 that controls energization of switch 161. The zero level signal from logic network 99 of target classification network 73.1 is also fed in parallel to a plurality of OR gates 183, only one of which is illustrated, and to the inhibit terminal of gate 182.2. The other input terminal of inhibit gate 182.2 is connected to the zero level output of logic network 99 included in target classification network 73.2. The output of inhibit gate 182.2 is fed in parallel to gates 183 and to lead 172 for selectively activating switch 162. In the six target classification system being considered, four OR gates 183 are provided, one each for feeding signals to the inhibit terminals of the gates 182 responsive to the zero output level signals of networks 99 in target classifiers 73.2–73.6. Each of OR gates 183 combines the signal on lead 171 with all of the outputs of inhibit gates 182 having a lower number than the inhibit gate it feeds. (To simplify the drawing, only two of the five inhibit gates are specifically illustrated, namely gates 182.2 and 182.6, for feeding the zero level output signals from target classification networks 73.2 and 73.6 to switches 162 and 163, respectively. If each of the inhibit gates were illustrated, the gates responsive to target classifiers 73.2–73.5 would be numbered 182.2–182.5, respectively.) Thus, the inhibit gate responsive to the zero signal from network 99 of classifier 73.4 is fed by an OR gate that responds to the signal on lead 171 and to the outputs of the inhibit gates responsive to target classifiers 73.2 and 73.3.

If it should develop that all of the memories of target classification networks 173.1–173.6 have signals stored therein and the voltages in hold networks 71 are not approximately equal to the voltages derived on leads 105 and 106 of any of the target classification networks, the signals in the hold networks are not fed to any of the target classification networks, i.e., the signals are discarded. The signals in hold networks 71 are decoupled from all of the target classification networks in such a situation in response to energization of switch 145, whereby armatures 141–143 engage contacts 151–153, respectively, while each of switches 167–169 is deenergized. Of course, this is the desirable result since the number of target classification networks provided is equal to or greater than the number of helicopters in the formation, whereby such voltages are developed in hold networks 71 only in response to the simultaneous occurrence of pulses from more than one radiation source on board helicopters 12–16.

To provide a more complete understanding as to the manner in which the system of FIG. 4 operates, a complete operation cycle is now described. Initially, it is assumed that none of the helicopters in the formation has emitted radiation pulses, whereby the storage mediums or records 81 on board helicopter 11 in each of target classification networks 73.1–73.6 contains no information, and that this situation exists at time $t=0$.

Under the assumed initial conditions, the zero level output of logic networks 99 in each of target classification networks 73.1–73.6 is activated and a binary zero is derived from AND gate 111 of each of the target classification networks. In response to these binary zero signals, a binary zero signal is derived by OR gate 154 on lead 146, whereby switch 145 is deenergized and armatures 141–143 are connected with contacts 147–149, respectively. The binary one signals on the zero level output of logic networks 99 are fed to unused memory selector 181, causing switch 161 to be activated to the exclusion of each of the other switches in the six switch pairs. Switches 162 and 163 are not activated because the binary one signals applied to gates 182.2 and 182.6 are inhibited. Gate 182.2 is inhibited directly in response to the binary one signal from the zero level output of logic network 99 of target classification network 73.1. The remaining gates in memory selector 181 are inhibited in response to the binary one signal on lead 171 in response to the output of the OR gate coupled to the inhibit inputs of each inhibit gate. For example, gate 182.6 is inhibited in response to binary one signal from lead 171 being coupled through OR gate 183. Each of switches 167–169 is now energized since there are zero voltage levels in hold network 71 and each of the memories of target classification networks 73.1–73.6. The closed condition of switches 167–169 is ineffective, however, to feed any signals into read-in heads 82 of the target classification networks in response to deenergization of switch 145, whereby no voltages are applied to contacts 151–153.

With the initial conditions described, let it be assumed that at time $t=0.050$ second a radiation pulse is emitted from the source on board helicopter 12 and is substantially simultaneously received by the array comprising receivers 151–154 on helicopter 11. In response to the magnitude of the energy impinging on receivers 151–154, there are derived by networks 57, 58 and 59 variable amplitude voltage pulses $B_{12}'$, $B_{12}' \sin \theta_{12}$ and $B_{12}' \cos \theta_{12}$, respectively. The output signals of networks 57–59, indicative of the relative range and azimuthal position of helicopters 11 and 12, are fed to hold networks 71, which store the signal magnitudes fed thereto.

The signals stored in hold networks 71 are fed through switch 145 via contacts 147–149 to armatures 156–158 of switch 161 from whence they are coupled to read-in heads 82 of record 81, incorporated in target classification network 73.1. In response to the $B_{12}'$ voltage applied to head 82, step motor 87 is activated after the read-in operation has been completed to advance magnetic tape 81 so that the signals just read into the tape are translated to read-out heads 83. The voltage picked up by one of the read-out heads 83–85 in the $B_1'$ channel of record 81 activates the "one" output level of logic network 99 so that a binary one state is derived. Simultaneously, the "zero" level output of network 99 is driven from the binary one to the binary zero state. The binary one signal generated on the "one" level output of logic network 99 activates each of switches 101, connected to potentiometers 96–98 in the output circuits of amplifiers 93–95, to the closed position so that the voltages applied to amplifiers 93–95 by read-out heads 83 are fed to leads 105–107.

The signals on leads 105 and 106 are favorably compared with the $B_1'$ and $B_1' \sin \theta$ signals in hold networks 71, whereby comparison networks 108 and 109 derive binary one signals that are fed to AND gate 111. In response to AND gate 111 being supplied with binary one signals on both of its input leads, the AND gate generates a binary one signal that is fed in parallel to AND gate 116, OR gate 154 and signal routing network 72 and the control input lead 174 of switch 167, FIG. 7. In response to the binary one signal fed to OR gate 154, switch 145 is activated to connect armatures 141–143 with leads 151–153 while switch 167 is activated to supply, without interruption, the signals indicative of the location of target 12 to the memory of target classification network 73.1.

Simultaneously with energization of switch 167, each of switches 168 and 169 is deenergized because the inputs to target classification networks 73.2 and 73.6 from hold networks 71 are no longer equal to the zero voltages developed on leads 105 and 106 of those target classification networks. In response to a substantial difference between the inputs of the comparison networks 108 and 109 of target classification networks 73.2 and 73.6, the binary one output of AND gate 111 is changed to a binary zero signal, whereby switches 168 and 169 are deenergized. Switching between switches 161 and 167 and the activation of switch 145 are at sufficiently high speed to maintain the input to delay network 88 substantially constant, whereby step motor 87 is activated only once in response to the radiation pulse occurring at $t=0.050$ second.

It is next assumed that a radiation pulse is derived from helicopter 13 at $t=0.075$ second. The pulse occurring at $t=0.075$ second is fed by receivers 51–54 to combining networks 57, 58 and 59 which respectively derive voltages equal to $B_{13}'$, $B_{13}' \sin \theta_{13}$ and $B_{13}' \cos \theta_{13}$. The voltages developed by networks 57–59 are fed to holding networks 71, the outputs of which change instantly in response to the new finite voltages applied to them. In the 0.025 second interval between pulses from helicopters 12 and 13 when zero voltages are derived from networks 57–59, holding networks 71 maintain the $B_{12}'$, $B_{12}' \sin \theta_{12}$ and $B_{12}' \cos \theta_{12}$ voltages therein. Regardless of the magnitude of the voltages associated with the position of helicopter 13, as long as two of them have a finite non-zero value, the output voltages of holding networks 71 jump to values equal to $B_{13}'$, $B_{13}' \sin \theta_{13}$ and $B_{13}' \cos \theta_{13}$.

The signals in holding network 71 derived in response to radiation from helicopter 13 are initially compared with the stored voltages on loads 105 and 106 of target classification network 73.1. Because there is a material difference between the voltages now in holding networks 71 and the voltages on leads 105 and 106 of network 73.1, comparison networks 108 and 109 of network 73.1 derive binary zero signals. The binary zero signal from AND gate 111 of target classification network 73.1 is fed via lead 174 to switch 167, to open the switch contacts. Since a binary zero signal is now developed on lead 171 in response to the zero level of logic network 99 of target classification network 73.1 being in an unactivated state, the signals in holding networks 71 cannot be fed to target classification network 73.1.

In response to the binary zeros now derived from the AND gates 111 of each of target classification networks 73.1–73.6 and the zero output of NAND gate 155, OR gate 154 derives a binary zero signal whereby armatures 141–143 of switch 145 are driven into engagement with contacts 147–149, respectively. A binary one signal is now derived from gate 182.2 since the inhibit terminal thereof is not activated and the memory of target classification network 73.2 has no signals stored therein. In response to gate 182.2 passing a binary one signal through it, lead 172 is activated causing switch 162 to be closed and the signals in hold networks 71 to be supplied to read-in heads 82 of target classification network 73.2.

It is next assumed that the sources on helicopters 14, 15 and 16 respectively generate radiation pulses at $t=0.85$, 0.100 and 0.120 second. In response to the pulses from the sources on helicopters 14, 15 and 16 and in the manner described for network 73.2, target classification networks 73.3, 73.4 and 73.5 are loaded with signals indicative of the range and azimuthal position of helicopter 11 relative to helicopters 14, 15 and 16. Thereby, at $t=0.125$ millisecond, each of target classification networks 73.1–73.5 has a signal set of range and azimuth signals stored therein while target classification network 73.6 remains unloaded.

At $t=0.125$ millisecond, no signals have yet been fed to deflection control network 74 because each of the storage elements 81 has only one set of signals stored therein. In response to only one set of signals being stored in memory 81, logic network 99 derives a binary one signal on its "one" level output and binary zero signals are derived on its "two" and "three" level outputs. In response to the binary zeroes applied to both inputs of OR gate 115, FIG. 5, AND gate 116 is disabled, whereby the binary one output of AND gate 111 is not fed to the AND gate 116 output. In consequence, switches 112–114 remain closed and no voltages are applied to deflection control network 74.

At $t=0.130$ second, it is assumed that a radiation pulse is again emitted from the source on board helicopter 12. In response to the pulse from the source on helicopter 12, networks 57–59 again derive voltages having approximately the same values as the voltages derived in response to the radiation pulses received at $t=0.050$ second. Of course, there is not a material deviation between the amplitudes of the pulses received at $t=0.050$ second and $t=0.130$ second because the relative position between helicopters 11 and 12 cannot vary materially within such a short time interval. The signals derived from hold networks 71 are compared in each of the target classification networks 73.1–73.6, and since they are approximately equal to the signals stored in target classification network 73.1, comparison networks 108 and 109 of target classification network 73.1 derive binary one signals that are combined in AND gate 111.

The binary one output of AND gate 111 is fed to switches 145 and 167, whereby signals are again applied to read-in heads 82 of target classification network 73.1. The new set of signals applied to read-in head 82 are recorded on magnetic storage means 81 and the storage means is translated so that the signals occurring at $t=0.050$ second and at $t=0.130$ second are read out by heads 84 and 83, respectively. Step motor 87 responds to the new voltage level applied to read-in head 82 because there is a substantial difference of 0.080 second between the times when adjacent signals were applied to the $B_1'$ read-in head 82.

In response to the $B_1'$ read-out heads 83 and 84 both having finite voltages thereon, logic network 99 of target classification network 73.1 is activated so that its "two" level derives a binary one output. In response to the "two" level of logic network 99 being activated, switches 103 connected to taps on potentiometers 96–98 are closed and formerly closed switches 101 are opened since a binary one signal is no longer being derived on the "one" level output of logic network 99. In consequence, signals derived on leads 105–107 are equal to the average values of the signals being read out by heads 83 and 84. Thereby, comparison networks 108 and 109 continued to derive binary one signals and a binary one output is generated by AND gate 111. The binary one output of AND gate 111 is combined in AND gate 116 with the binary one signal coupled through OR gate 115 by the "two" level output of logic network 99. Since both inputs to AND gate 116 are now a binary one, the AND gate generates a binary one signal that closes each of switches 112–114. In response to switches 112–114 being closed, signals are applied by target classification network 73.1 to control circuit 74, whereby the cathode ray beam of CRT 65 is deflected to a spot on CRT face 66 commensurate with the position of helicopter 12.

In a similar manner, each of target classification networks 73.2–73.5 responds to a second radiation pulse received from each of helicopters 13–15 during the next 100 millisecond time interval. Hence, at the time $t=0.230$ millisecond, each of target classification networks 73.1–73.5 stores two indications of the position of helicopters 12–15, respectively. The remaining target classification network 73.6 has no signals stored in the memory thereof but will receive the next target indicating signals that are materially different from any of the previously stored signals because each of the inputs to OR gate 183 is now a binary zero.

It is next assumed that at $t=0.235$ second helicopters 12 and 13 simultaneously emit radiation pulses. These radiation pulses are simultaneously detected by the array comprising receivers 51–54, whereby combining networks 57–59 derive voltages that differ from any voltages previously generated by them. The voltages derived by combining networks 57–59 in response to the pulses occurring at $t=0.235$ second are fed to holding network 71 and compared with the average values of the voltages stored in each of target classification networks 73.1–73.6. Because the voltages now derived from holding network 71 are materially different from the average values of any of the stored signals in networks 73.1–73.6 there are derived a binary one signal by inhibit gate 182.6 (in unused memory selector 181) and a binary zero output by OR gate 154, whereby the states switches 145 and 163 are changed. In response to the changed states of switches 145 and 163, the signals in hold network 71 are supplied to read-in head 82 of memory 81, incorporated in target classification network 73.6.

The signal magnitudes stored in memory 81 of target classification network 73.6 are processed in the target classification network as if they were signals derived from a single helicopter source. They are not, however, gated to deflection control network 74 because switches 112–114 are not closed in response to only one signal being stored in memory 81. Because of the extremely low probability, virtually zero, of helicopters 12–13 emitting simultaneous pulses during the next 0.150 second time interval, the output of stretching network 92 in target classification network 73.6 falls to a binary zero level at $t=0.385$ second. Within 100 milliseconds after a binary zero is derived from stretching network 92, clock pulse source 89 feeds a pulse through gate 91 to step motor 87, whereby the signal read into tape 81 by heads 82 at $t=0.235$ second is translated to be read out by heads 84. After another 0.100 second time interval, another pulse is derived from clock 89 of target classification network 73.6 and step motor 87 is again activated to translate the signal on record 81 so that it is read out by heads 85. After a further 100 millisecond time interval, clock 89 is again activated and the signals recorded in response to simultaneous activation of helicopters 12 and 13 are removed from the record by erasing heads 86. Thereby, the signals stored on record 81 in response to the simultaneous occurrence of radiation pulses from helicopters 12 and 13 are completely removed from the storage medium in a maximum time of 450 milliseconds from the time when both helicopters simultaneously emitted pulses and are not displayed.

From the foregoing description, it is believed obvious as to the manner in which the target classification networks store only those signals which are derived from a single helicopter emitting radiation at one time. Of course, the same principles of operation apply to helicopter formation keeping as different helicopters enter into and leave the formation.

While I have described and illustrated several specific embodiments of my invention, it will be clear that variations of the details of construction which are specifically illustrated and described may be made without departing from the true spirit and scope of the invention as defined by the appended claims.

I claim:

1. A method of determining the relative position of more than two objects in a group comprising the steps of: emitting, on the average during a selected time interval, a predetermined number of radiation pulses at random occurrence times from a source on each of a plurality of said objects; detecting said pulses on one of said objects; processing said detected pulses in a single time shared processing channel so that the amplitude of the detected radiation is transposed into a signal indicative of the apparent position, relative to the object where the pulses are detected, of a radiation source; and displaying said signals except those that are derived in response to radiation from a plurality of radiation sources being substantially simultaneously pulsed.

2. The method of claim 1 further including the step of reducing the number of said pulses from each source as the number of sources in the group increases.

3. The method of claim 1 wherein said pulses are of penetrating radiation.

4. A method of determining the relative position of more than two objects in a group comprising the steps of: emitting, on the average during a selected time interval, a predetermined number of radiation pulses at random occurrence times from a source on each of a plurality of said objects; detecting said pulses on one of said objects; processing said detected pulses in a single time shared processing channel so that the amplitude of the detected radiation is transposed into a signal indicative of the apparent position, relative to the object where the pulses are detected, of a radiation source; and visually displaying only those signals that are of approximately the same magnitude as a previous signal that was derived during a predetermined time interval.

5. The method of claim 4 wherein said pulses are of penetrating radiation.

6. In a system for determining the relative position between more than two objects, a plurality of said objects each including a source emitting, on the average over a predetermined time interval, an equal number of radiation pulses having random occurrence times, one of said objects comprising: a detector of said pulses; a single time shared means responsive to said detector for deriving signals indicative of the apparent position of each object; visual display means responsive to said signals for indicating the position of said plural objects relative to said one object; and means for activating said visual display means only in responsive to those signals that repeatedly have approximately the same value within a predetermined time interval.

7. The system of claim 6 wherein said display activating means comprises a memory responsive to said signals, and means for comparing the magnitude of the signals in said memory with the magnitude of the signals derived by said deriving means to determine those signals that activate said display means.

8. The system of claim 7 wherein said memory includes several different channels, and means for applying signals that are not approximately the same as any stored signals to a channel having no signals stored therein until all of said channels have a signal stored therein.

9. The system of claim 7 wherein said memory includes means for storing a plurality of signals having approximately the same amplitude, means for averaging the values of the stored signals, and said means for comparing is responsive to the average value of said stored signals.

10. The system of claim 9 wherein said activating means includes means for applying the average value of stored signals to said display.

11. A system for deriving a controlled number of penetrating radiation pulses, on the average, over a predetermined time interval, but at randomly occurring times, comprising a random pulse source, said pulse source including a radioactive isotope source, a detector responsive to energy from said radioactive source including means for derivng electric pulses of predetermined amplitude and duration in response to energy from the isotope source exceeding a predetermined amplitude, shield means for said radiation positioned between said source and detector means, an X-ray source, and means responsive to said pulse deriving means for enabling said X-ray source in response to said electric pulses of predetermined amplitude and duration.

12. The system of claim 11 further including means for changing at will the average number of pulses from said source impinging on said detector.

13. The system of claim 12 wherein said means for changing the average number of pulses comprises means for varying the volume of said shield means disposed in the radiation path between said source and detector.

14. A system for deriving a controlled number of penetrating radiation pulses, on the average, over a predetermined time interval, but at randomly occurring times, comprising a random pulse source, said pulse source including a radioactive isotope source, detector means responsive to energy from said radioactive isotope source for deriving electric pulses of predetermined amplitude and duration in response to energy from the isotope source exceeding a predetermined amplitude, a normally cut-off source of X-rays, and means responsive to said detector means for pulsing said X-ray source into an activated condition in response to said electric pulses of predetermined amplitude and duration.

15. The system of claim 6 wherein the source on each of the plurality of objects includes a radioactive isotope source, detector means responsive to energy derived from said radioactive isotope source for deriving electric pulses of predetermined amplitude and duration in response to energy from the isotope source exceeding a predetermined amplitude, a normally cut-off source of X-rays, and means responsive to said detector means for pulsing said X-ray source into an activated condition in response to said electric pulses of predetermined amplitude and duration.

16. The system of claim 15 further including shield means for said radiation positioned between said source and detector means.

17. The system of claim 16 further including means for at will changing the average number of electric pulses derived by said detector means.

18. The system of claim 17 wherein said means for changing comprises means for varying the volume of the shield means disposed in the radiation path between said isotope source and detector means.

19. The system of claim 6 wherein said signals indicative of apparent position are derived as signal pulses having occurrence times related to the apparent range of the objects from said one object and amplitudes related to the apparent angular position of the objects from said one object, and said display means comprises a plan position indicator responsive to said signal pulses.

20. The system of claim 19 wherein said indicator includes a cathode ray tube responsive to said signal pulses, said cathode ray tube including a face, means for forming a cathode ray beam, and means for deflecting the beam to a position on the face indicated by the occurrence time and amplitude of said signal pulses, said face providing a visual indication of the average intensity of the cathode ray beam striking portions thereof.

21. The system of claim 6 wherein said signal deriving means includes means responsive to said detector for deriving signals proportional to $B_1'$, $B_1' \sin \theta$ and $B_1' \cos \theta$ where:

$B_1'$ = the total intensity of radiation from said pulses reaching said detector at any instant, and $\theta$ = the angular orientation of the average energy from said pulses reaching said detector at any instant.

22. The system of claim 21 wherein said display means includes a plan position indicator, said signal deriving means further includes means for simultaneously instigating orthogonal sweeps of said indicator at rates indicative of $B_1' \sin \theta$ and $B_1' \cos \theta$, and means for activating said display at a time relative to the instigation of said sweeps inversely proportional to $B_1'$.

References Cited

UNITED STATES PATENTS

| | | | |
|---|---|---|---|
| 3,171,030 | 2/1965 | Foster et al. | 250—95 |
| 3,123,714 | 3/1964 | Chope | 250—43.5 |
| 2,275,748 | 3/1942 | Fearon | 250—83.6 |
| 3,046,430 | 7/1962 | Green | 250—106 |

JAMES W. LAWRENCE, Primary Examiner

D. L. WILLIS, Assistant Examiner

U.S. Cl. X.R.

250—71.5R, 102, 106VC; 343—112CA